United States Patent
Choi et al.

(10) Patent No.: US 12,401,304 B2
(45) Date of Patent: Aug. 26, 2025

(54) MOTOR DRIVING APPARATUS AND CONTROL METHOD THEREOF

(71) Applicants: Hyundai Motor Company, Seoul (KR); Kia Corporation, Seoul (KR)

(72) Inventors: Ho Rim Choi, Hwaseong-si (KR); Seong Min Kim, Hangwon-si (KR); Seon Mi Lee, Anyang-si (KR); Tae Il Yoo, Seongnam-si (KR); Seung Hyeon Bin, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 266 days.

(21) Appl. No.: 18/134,681

(22) Filed: Apr. 14, 2023

(65) Prior Publication Data

US 2024/0106362 A1   Mar. 28, 2024

(30) Foreign Application Priority Data

Sep. 28, 2022   (KR) .......... 10-2022-0123511

(51) Int. Cl.
  *H02P 27/06*   (2006.01)
  *H02P 23/14*   (2006.01)

(52) U.S. Cl.
  CPC .............. *H02P 23/14* (2013.01); *H02P 27/06* (2013.01)

(58) Field of Classification Search
  CPC ....... H02P 23/14; H02P 27/06; H02P 21/0089
  See application file for complete search history.

(56) References Cited

U.S. PATENT DOCUMENTS

| | | | |
|---|---|---|---|
| 9,853,570 B2 * | 12/2017 | Maly ................. | B60L 50/50 |
| 2014/0062375 A1 * | 3/2014 | Suzuki ............... | H02P 21/22 |
| | | | 318/496 |
| 2019/0222140 A1 | 7/2019 | Nikolov et al. | |
| 2019/0296677 A1 * | 9/2019 | Oka ................... | H02P 21/18 |
| 2020/0336027 A1 * | 10/2020 | Takahashi .......... | H02P 21/0089 |

FOREIGN PATENT DOCUMENTS

| | | |
|---|---|---|
| CN | 106026815 A | 10/2016 |
| JP | 9-56184 A | 2/1997 |
| JP | 2012-182912 A | 9/2012 |
| JP | 2016-063562 A | 4/2016 |
| JP | 2022-046176 A | 3/2022 |
| KR | 10-2014-0072630 A | 6/2014 |
| KR | 10-2023-0031066 A | 3/2023 |
| KR | 10-2024-0050077 A | 4/2024 |

\* cited by examiner

*Primary Examiner* — Rina I Duda
(74) *Attorney, Agent, or Firm* — Morgan, Lewis & Bockius LLP

(57) ABSTRACT

A motor driving apparatus includes a motor having a plurality of windings, a first inverter which is connected to a first end of each of the plurality of windings and drives the motor, a second inverter which is connected to a second end of each of the plurality of windings and selectively drives the motor according to a motor drive mode, and a controller which generates a current command for the motor according to a torque command and a voltage utilization rate control value, determines whether to perform linearization control for the current command based on a present counter magnetic flux of the motor and a switching reference counter magnetic flux for the motor drive mode, and adjusts the voltage utilization rate control value such that a value of the current command is linearized in a section in which the linearization control is performed.

16 Claims, 10 Drawing Sheets

Embodiment

MOTOR DRIVING APPARATUS AND CONTROL METHOD THEREOF

CROSS REFERENCE TO RELATED APPLICATION

The present application claims priority to Korean Patent Application No. 10-2022-0123511, filed Sep. 28, 2022 in the Korean Intellectual Property Office, the entire contents of which are incorporated herein for all purposes by this reference.

TECHNICAL FIELD

The present disclosure relates generally to a motor driving apparatus and a control method thereof. More particularly, the present disclosure relates to a motor driving apparatus which alleviates the shock of the output torque of a motor occurring during switching of a motor drive mode and a control method thereof.

BACKGROUND

Recently, as a motor driving technology capable of improving system efficiency while covering both low and high power sections with one motor is required, a technology of driving one motor in two different modes by using two inverters and a mode changeover switch is being introduced.

Here, one of the two different modes is a closed end winding (CEW) mode in which a motor is driven by one inverter by using a Y-connection structure, and the other is an open end winding (OEW) mode in which a motor is driven by two inverters.

Since the CEW mode and the OEW mode have different voltage utilization rates of an inverter, a field weakening control entry condition may also be different for each mode. In this case, the CEW mode can perform field weakening control at a lower RPM compared to the OEW mode. Here, the field weakening control corresponds to a method of controlling a motor at high speed by lowering the magnetic flux of the motor in a section in which the speed of the motor is equal to or greater than a base RPM.

Accordingly, a mode switching criterion between the CEW mode and the OEW mode is required to be preset in consideration of field weakening control entry conditions different from each other. For example, when the mode switching criterion allows a motor drive mode to be switched while field weakening control is performed in a CEW mode, the shock of the output torque of a motor may occur due to sudden change of current command. Unlike this, when a mode switching criterion is preset such that a motor drive mode is switched before field weakening control is performed in a CEW mode, the efficiency of an inverter-motor system may decrease.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and the present disclosure is intended to propose a motor driving apparatus and a control method thereof in which the shock of the output torque of a motor occurring during the switching of a motor drive mode is alleviated by performing linearization control of adjusting a voltage utilization rate control value such that a value of current command for the motor is linearized even if the motor drive mode is switched during field weakening control.

Technical objectives to be achieved in the present disclosure are not limited to the technical objective mentioned above, and other technical objectives not mentioned above will be clearly understood to those skilled in the art to which the present disclosure belongs from the following description.

In order to achieve the above objective, according to one aspect of the present disclosure, there is provided a motor driving apparatus including: a motor having a plurality of windings; a first inverter which is connected to a first end of each of the plurality of windings and drives the motor; a second inverter which is connected to a second end of each of the plurality of windings and selectively drives the motor according to a motor drive mode; and a controller which generates a current command for the motor according to a torque command and a voltage utilization rate control value, determines whether to perform linearization control for the current command based on a present counter magnetic flux of the motor and a switching reference counter magnetic flux for the motor drive mode, and adjusts the voltage utilization rate control value such that a value of the current command is linearized in a section in which the linearization control is performed.

In addition, in order to achieve the above objective, according to an embodiment of the present disclosure, there is provided a control method of the motor driving apparatus, the method including: generating a current command for the motor according to a torque command and a voltage utilization rate control value; determining whether to perform linearization control based on a present counter magnetic flux of the motor and a switching reference counter magnetic flux for the motor drive mode; and adjusting the voltage utilization rate control value such that a value of the current command is linearized in a section in which the linearization control is performed.

According to the present disclosure, it is possible to alleviate the shock of the output torque of a motor occurring during the switching of a motor drive mode by performing linearization control of adjusting a voltage utilization rate control value such that a value of current command for the motor is linearized.

Effects obtainable from the present disclosure are not limited to effects described above, and other effects not described above will be clearly appreciated from the following description by those skilled in the art.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE DISCLOSURE

Figure 1:
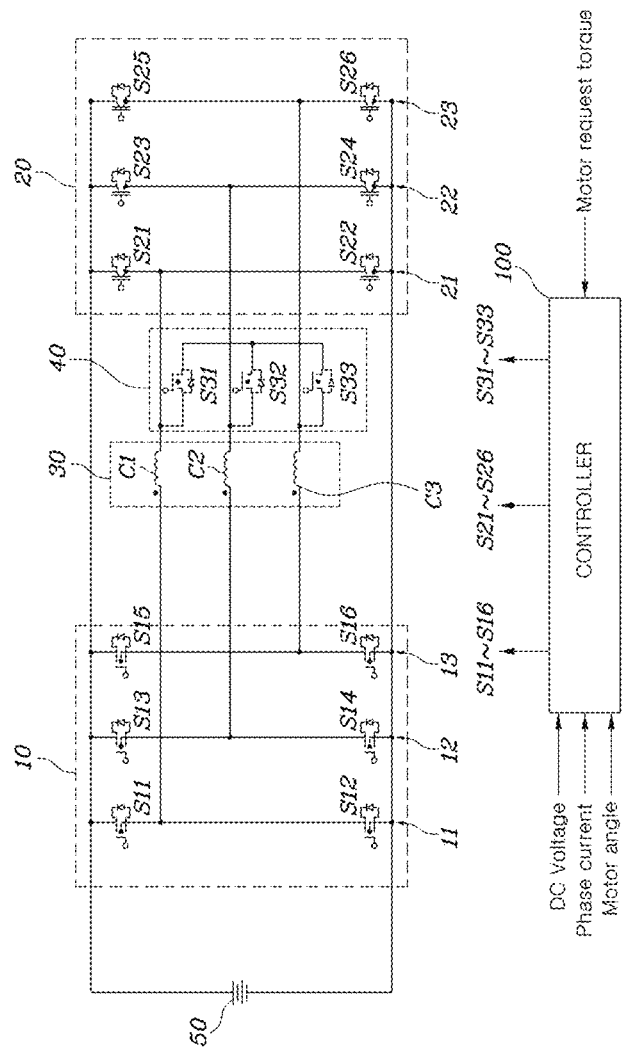
FIG. 1 is a circuit diagram of a motor driving apparatus according to an embodiment of the present disclosure.

Hereinafter, an embodiment disclosed in the present specification will be described in detail with reference to the accompanying drawings, but the same or similar components regardless of reference numerals are assigned the same reference numerals, and overlapping descriptions thereof will be omitted. Terms "module" and "unit" for the components used in the following description are given or mixed in consideration of only the ease of writing the specification, and do not have distinct meanings or roles by themselves. In addition, when it is determined that detailed descriptions of related known technologies may obscure the gist of the embodiment disclosed in this specification in describing the embodiment disclosed in the present specification, the detailed description thereof will be omitted. In addition, the accompanying drawings are only for easily understanding the embodiment disclosed in this specification, and do not limit the technical idea disclosed herein, and should be understood to cover all modifications, equivalents or substitutes falling within the spirit and scope of the present disclosure.

Terms including an ordinal number, such as first and second, etc., may be used to describe various elements, but the elements are not limited by the terms. The terms are used only for the purpose of distinguishing one element from another.

It should be understood that when an element is referred to as being "coupled" or "connected" to another element, it may be directly coupled or connected to the another element, or intervening elements may be present therebetween. On the other hand, it should be understood that when an element is referred to as being "directly coupled" or "directly connected" to another element, there are no intervening elements present.

Singular forms include plural forms unless the context clearly indicates otherwise.

In the present specification, it should be understood that terms such as "comprises" or "have" are intended to designate that features, numbers, steps, operations, components, units, or combinations thereof described in the specification exist, but do not preclude the possibility of the existence or addition of one or more other features, numbers, steps, operations, components, units, or combinations thereof.

In addition, a unit or control unit included in names such as a motor control unit (MCU) and a hybrid control unit (HCU) is only a term widely used in the naming of a controller that controls the specific function of a vehicle, but does not mean a generic function unit. For example, to control a function for which each controller is responsible, the controller may include a communication device that communicates with other controllers or sensors, a memory that stores an operating system, a logic command, and input/output information, and one or more processors that perform judgment, calculation, and determination necessary for controlling the function in charge.

FIG. 1 is a circuit diagram of a motor driving apparatus according to the embodiment of the present disclosure.

As illustrated in FIG. 1, the motor driving apparatus may include a first inverter 10, a second inverter 20, the motor 30 having a plurality of windings C1 to C3 corresponding respectively to a plurality of phases, a mode switching unit 40, a battery 50, and a controller 100.

The first inverter 10 may include a plurality of first switching elements S11 to S16 connected respectively to first ends of the plurality of windings C1 to C3, and the second inverter 20 may include a plurality of second switching elements S21 to S26 connected respectively to second ends of the plurality of windings C1 to C3. The mode switching unit 40 may include a plurality of mode changeover switches S31 to S33 which is located between the second end of each of the plurality of windings C1 to C3 and a neutral terminal for the plurality of windings C1 to C3 and is connected thereto. The controller 100 may control the on/off states of the first switching elements S11 to S16, the second switching elements S21 to S26, and the mode changeover switches S31 to S33 based on a motor request output (that is, a torque command for the motor), a DC voltage, a phase current, and a motor angle.

The first inverter 10 and the second inverter 20 may convert DC power stored in the battery 50 into three-phase AC power and may output the three-phase AC power to the motor 30, or may convert regenerative braking energy generated due to regenerative braking torque of the motor 30 generated during regenerative braking into DC power and output the DC power to the battery 50. This conversion between DC power and AC power may be performed by the pulse width modulation control of the plurality of first switching elements S11 to S16 and the plurality of second switching elements S21 to S26 provided in the first inverter 10 and the second inverter 20, respectively.

The first inverter 10 may include a plurality of legs 11 to 13 to which a DC voltage formed in a DC link capacitor (not shown) connected between opposite ends of the battery 50 is applied. The legs 11 to 13 may correspond respectively to a plurality of phases of the motor 30 to form electrical connections therebetween.

The second inverter 20 may include a plurality of legs 21 to 23 to which a DC voltage formed in a DC link capacitor (not shown) connected between opposite ends of the battery 50 is applied. The legs 21 to 23 may correspond respectively to a plurality of phases of the motor 30 to form electrical connections therebetween.

The controller 100 may control the on/off state of the mode changeover switches S31 to S33 included in the mode switching unit 40 according to a motor drive mode and may determine whether to drive the motor 30 through the second inverter 20.

The motor drive mode may include a closed end winding (CEW) mode and an open end winding (OEW) mode.

More specifically, the CEW mode may correspond to a mode in which the controller 100 controls the mode changeover switches S31 to S33 to be turned on such that the second end of each of the plurality of windings C1 to C3 is electrically connected with the neutral terminal for the plurality of windings C1 to C3 and the motor 30 is driven through the first inverter 10 of the two inverters 10 and 20.

Unlike this, the OEW mode may correspond to a mode in which the controller 100 controls the mode changeover switches S31 to S33 to be turned off such that the second end of each of the plurality of windings C1 to C3 is electrically separated from the neutral terminal for the plurality of windings C1 to C3 and the motor 30 is driven through the two inverters 10 and 20.

That is, the first inverter 10 may drive the motor 30 regardless of the motor drive mode, whereas the second inverter may selectively drive the motor 30 according to the motor drive mode.

The controller 100 may maximize the efficiency of the motor driving apparatus according to an operating point by switching the motor drive mode including the CEW mode and the OEW mode with different voltage utilization rates MI for an inverter, based on a torque command for the motor 30 and the counter magnetic flux of the motor 30 according to the torque command.

According to an exemplary embodiment of the present disclosure, the controller 100 may include a processor (e.g., computer, microprocessor, CPU, ASIC, circuitry, logic circuits, etc.) and an associated non-transitory memory storing software instructions which, when executed by the processor, provides the functionalities of the controller 100. Herein, the memory and the processor may be implemented as separate semiconductor circuits. Alternatively, the memory and the processor may be implemented as a single integrated semiconductor circuit. The processor may embody one or more processor(s).

Meanwhile, the CEW mode and the OEW mode have field weakening control entry conditions different from each other due to voltage utilization rates MI different from each other for an inverter, and thus when the motor drive mode is switched, the shock of the output torque of the motor 30 may occur. This will be described in detail with reference to FIGS. 2 to 4.

Figure 2:
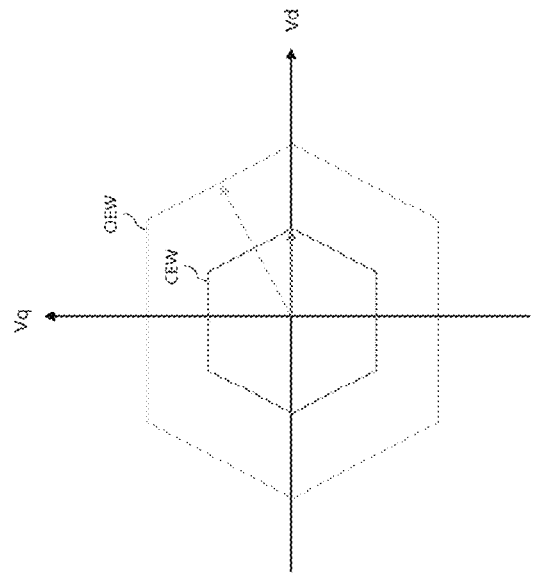
FIG. 2 is a diagram illustrating a voltage utilization rate for each motor drive mode according to the embodiment of the present disclosure a view.

FIG. 2 is a diagram illustrating a voltage utilization rate MI for each motor drive mode according to the embodiment of the present disclosure. Referring to FIG. 2, voltage vector hexagons of the CEW mode and the OEW mode, respectively, represented by a D-axis (direct-axis) voltage Vd and a Q-axis (quadrature-axis) voltage Vq are illustrated. The OEW mode may have a voltage vector hexagon larger than a voltage vector hexagon of the CEW mode. Accordingly, the OEW mode may have a voltage utilization rate MI higher than the voltage utilization rate MI of the CEW mode. For example, the OEW mode may have a voltage utilization rate MI $\sqrt{3}$ times higher than the voltage utilization rate MI of the CEW mode.

Figure 3:
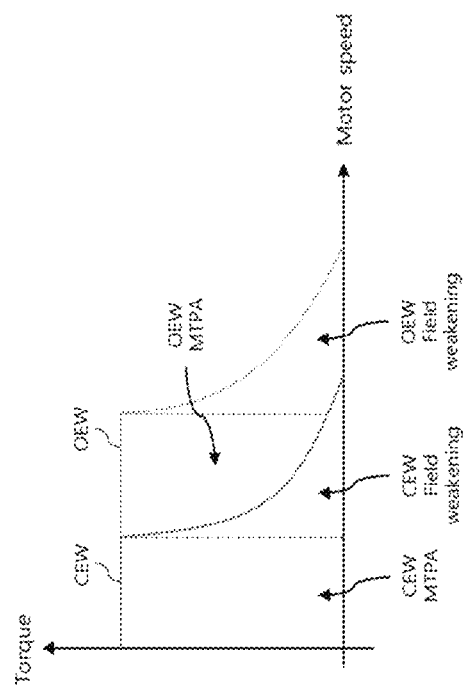
FIG. 3 is a diagram illustrating a torque limit curve for each motor drive mode according to the embodiment of the present disclosure.
Figure 4:
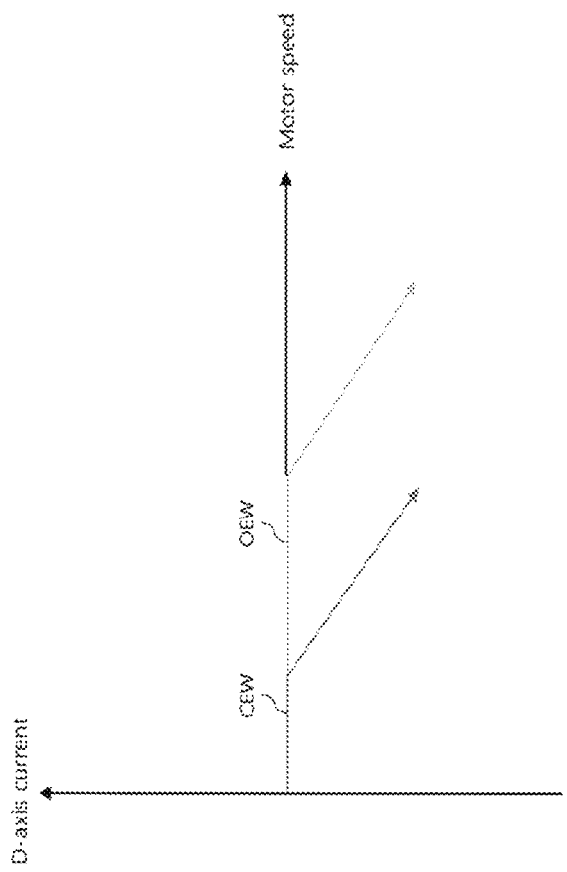
FIG. 4 is a diagram illustrating a field weakening control entry condition for each motor drive mode according to the embodiment of the present disclosure.

FIG. 3 is a diagram illustrating a torque limit curve for each motor drive mode according to the embodiment of the present disclosure, and FIG. 4 is a diagram illustrating a field weakening control entry condition for each motor drive mode according to the embodiment of the present disclosure.

Referring to FIG. 3, a maximum torque per ampere (MTPA) control area and a field weakening control area for each of the CEW mode and the OEW mode are illustrated.

Here, in a section in which a motor speed is lower than a base RPM, MTPA control minimizes a current flowing in a stator of a motor according to the combination of a D-axis (direct-axis) current and a Q-axis (quadrature-axis) current, and may correspond to a method in which the torque of the motor is controlled to be maximally output. In this case, the output torque of the motor may be constant in a section in which the MTPA control is performed. Field weakening control may correspond to a method of controlling the motor at high speed by lowering the magnetic flux of the motor by applying a D-axis (direct-axis) current to the motor in a section in which the speed of the motor is higher than a base RPM. In this case, in a section in which field weakening control is performed, as RPM of the motor increases, the output torque of the motor may decrease or the output power of the motor may be constantly output.

In the CEW mode and the OEW mode, due to voltage utilization rates MI different from each other, different base RPMs are preset, and thus a field weakening control entry condition may be different for each motor drive mode.

Referring to FIG. 4, the change of a direct-axis current for each of the CEW mode and the OEW mode is illustrated. In the CEW mode and the OEW mode, field weakening control may be performed by increasing a D-axis (direct-axis) current in a negative (−) direction at each of different RPMs.

That is, since the CEW mode and the OEW mode have field weakening control entry conditions different from each other, during the switching of the motor drive mode, the shock of the output torque of the motor may occur due to rapid change of a direct-axis current. For example, when the motor drive mode is switched from the CEW mode (a field weakening control area) to the OEW mode (an MTPW control area or a field weakening control area), a D-axis (direct-axis) current is rapidly reduced, so the shock of the output torque of the motor may occur. For another example, when the motor drive mode is switched from the OEW mode (an MTPW control area or a field weakening control area) to the CEW mode (a field weakening control area), a D-axis (direct-axis) current is rapidly increased, so the shock of the output torque of the motor may occur.

Accordingly, in the present embodiment, a torque shock generated during the switching of the motor drive mode is alleviated by performing the linearization control of adjusting a voltage utilization rate control value such that the value of D-axis (direct-axis) current command for the motor is linearized even if the motor drive mode is switched while performing field weakening control. A structure for this is illustrated in FIG. 5.

Figure 5:
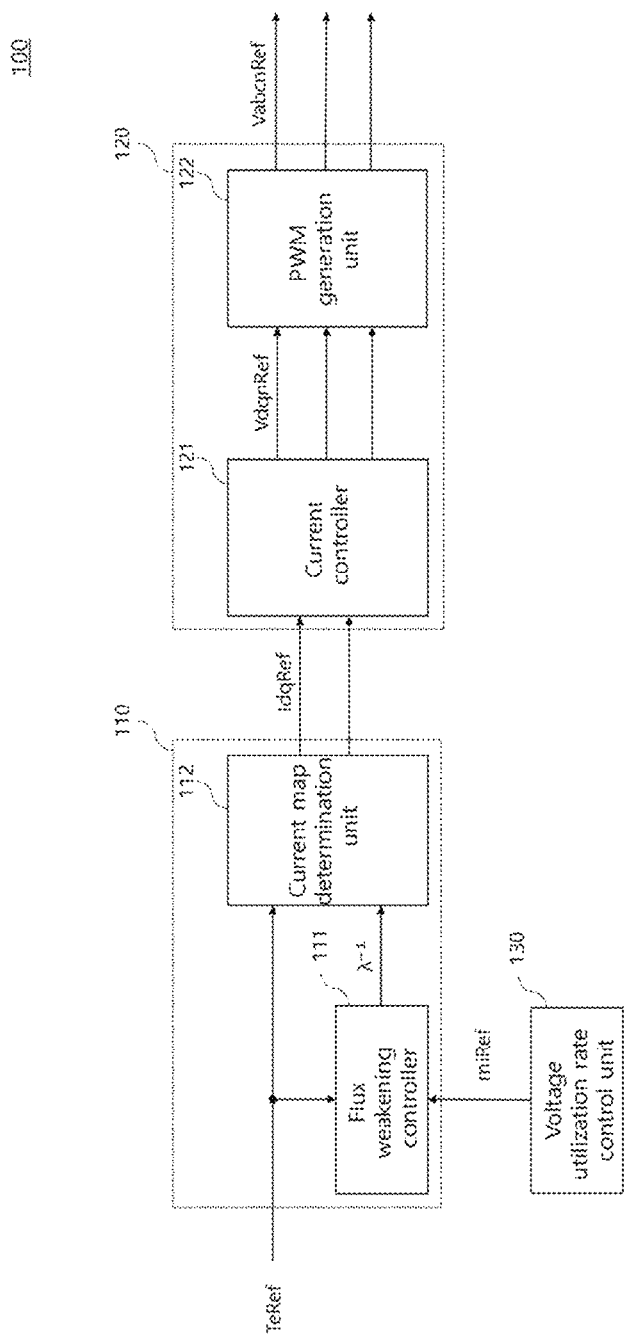
FIG. 5 is a block diagram illustrating the configuration of a controller according to the embodiment of the present disclosure.

FIG. 5 is a block diagram illustrating the configuration of the controller according to the embodiment of the present disclosure.

As illustrated in FIG. 5, the controller 100 may include a current command generation unit 110, a voltage command generation unit 120, and a voltage utilization rate control unit 130.

The current command generation unit 110 may include a flux weakening controller 111 which calculates a counter magnetic flux command $\lambda^{-1}$ through the PI control of the present counter magnetic flux of the motor based on the torque command TeRef and the voltage utilization rate control value miRef, and a current map determination unit 112 which outputs the current command IdqRef for a motor corresponding to the combination of the torque command TeRef and the counter magnetic flux command $\lambda^{-1}$ by referring to a current map. Accordingly, the current command generation unit 110 may generate the current command IdgRef according to the torque command TeRef and the voltage utilization rate control value miRef.

In this case, the voltage utilization rate control value miRef corresponds to a reference value for adjusting the voltage utilization rate of an inverter, and the current command IdgRef may include a D-axis (direct-axis) current command and a Q-axis (quadrature-axis) current command.

The voltage command generation unit 120 may include a current controller 121 which generates a DQ voltage command VdqnRef from the current command IdgRef, and a PWM generation unit 122 which receives the DQ voltage command VdqnRef and outputs a phase voltage command VabcnRef for an AC terminal of an inverter through pulse width modulation control of the DQ voltage command VdqnRef.

The voltage utilization rate control unit 130 may determine a maximum voltage utilization rate corresponding to the current speed of the motor by referring to a table including information about the maximum voltage utilization rate of an inverter for each speed (e, g., RPM) of the motor and may preset the voltage utilization rate control value miRef based on the maximum voltage utilization rate.

In addition, the voltage utilization rate control unit 130 may determine whether to perform linearization control for a D-axis (direct-axis) current command based on the present counter magnetic flux of the motor and a switching reference counter magnetic flux for the motor drive mode and may adjust the voltage utilization rate control value miRef such that the value of the D-axis current command is linearized in a section in which the linearization control is performed. In this case, the present counter magnetic flux of the motor may correspond to the ratio of current speed of a motor to a voltage of the DC end of an inverter. In addition, the motor drive mode may be switched when the present counter magnetic flux of the motor reaches the switching reference counter magnetic flux.

An operation method of the voltage utilization rate control unit 130 will be described in detail with reference to FIG. 6.

Figure 6:
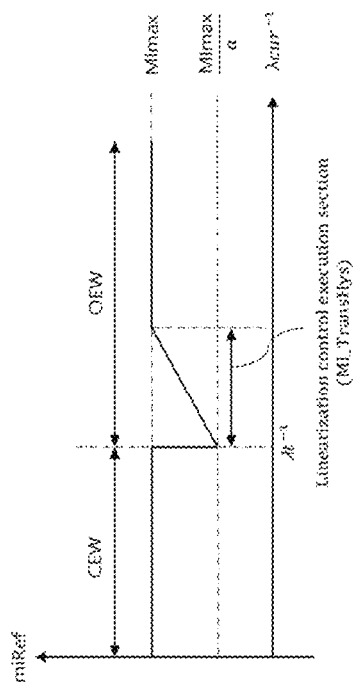
FIG. 6 is a diagram illustrating the operation of a voltage utilization rate control unit according to the embodiment of the present disclosure.

FIG. 6 is a diagram illustrating the operation of the voltage utilization rate control unit according to the embodiment of the present disclosure.

Referring to FIG. 6, when linearization control is not performed, the voltage utilization rate control unit 130 may preset the maximum voltage utilization rate MImax according to the current speed of the motor as the voltage utilization rate control value miRef as in Equation 1 below.

$$\text{miRef} = \text{MImax} \qquad \text{Equation 1:}$$

When the motor drive mode is as the OEW mode and when the present counter magnetic flux of the motor $\lambda\text{cur}^{-1}$ is within a preset value MI_TransHys from the switching reference counter magnetic flux $\lambda t^{-1}$, the voltage utilization rate control unit 130 may perform linearization control for a D-axis current command by adjusting the voltage utilization rate control value miRef based on the maximum voltage utilization rate MImax and an available voltage multiple a as in equation 2 below. In this case, the available voltage multiple a may correspond to a ratio of the available voltage of the OEW mode to the available voltage of the CEW mode. For example, the available voltage multiple may be preset as $\sqrt{3}$.

$$\text{miRef} = \text{MImax} \times \frac{(a-1) \cdot (\lambda cur^{-1} - \lambda t^{-1}) + MI_{TransHys}}{a \times MI_{TransHys}} \qquad \text{Equation 2}$$

Referring to equation 2, when the present counter magnetic flux of the motor $\lambda\text{cur}^{-1}$ and the switching reference counter magnetic flux $\lambda t^{-1}$ are the same in a section in which the linearization control is performed, the voltage utilization rate control unit 130 may preset a value obtained by dividing the maximum voltage utilization rate MImax by the available voltage multiple a as the voltage utilization rate control value miRef.

Accordingly, when the motor drive mode is switched from the CEW mode to the OEW mode, the voltage utilization rate control unit 130 may linearly increase the voltage utilization rate control value miRef from "MImax/a" to "MImax" until the stopping time of the linearization control after nonlinearly decreasing the voltage utilization rate control value miRef from "MImax" to "MImax/a" at the starting time of the linearization control.

Unlike this, when the motor drive mode is switched from the OEW mode to the CEW mode, the voltage utilization rate control unit 130 may linearly decrease the voltage utilization rate control value miRef from "MImax" to "MImax/a" from the starting time of the linearization control, and may nonlinearly increase the voltage utilization rate control value miRef from "MImax/a" to "MImax" at the stopping time of the linearization control.

Meanwhile, when high power of the motor is required (that is, when a high voltage utilization rate of an inverter is required), lowering the voltage utilization rate control value miRef in a section in which the linearization control is performed may cause a problem that the output torque of the motor does not increase rapidly.

Accordingly, the voltage utilization rate control unit 130 may additionally consider the motor drive mode, the present counter magnetic flux of the motor $\lambda\text{cur}^{-1}$, and the value of the torque command TeRef as a condition for determining whether to perform the linearization control. This will be described with reference to FIG. 7.

Figure 7:
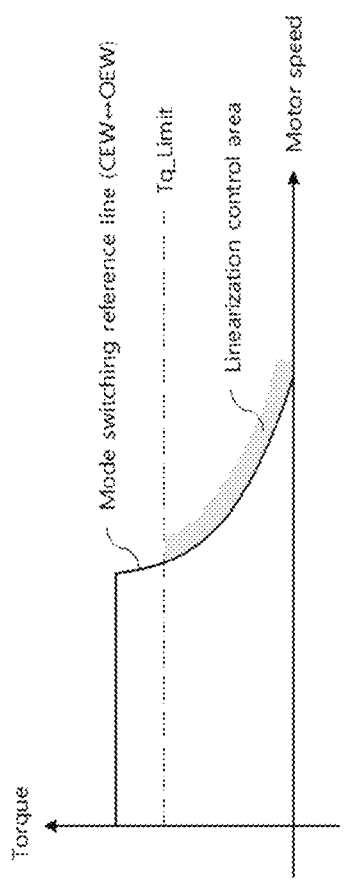
FIG. 7 is a diagram illustrating an operation of the voltage utilization rate control unit which presets an area in which linearization control is performed based on a value of a torque command according to the embodiment of the present disclosure.

FIG. 7 is a diagram illustrating an operation of the voltage utilization rate control unit which presets an area in which linearization control is performed based on a value of a torque command according to the embodiment of the present disclosure.

Referring to FIG. 7, in an operating point map for the motor, a mode switching reference line for the CEW mode and the OEW mode is illustrated. In the OEW mode, when the present counter magnetic flux of the motor proportional to the current speed of the motor is within a preset value from the switching reference counter magnetic flux for the mode switching reference line, and a value of the torque command is lower than a preset torque limit value Tq_Limit, the voltage utilization rate control unit 130 may perform linearization control. That is, when the value of the torque command is the preset torque limit value Tq_Limit or more, the voltage utilization rate control unit 130 blocks execution of the linearization control, thereby preventing the voltage utilization rate of an inverter from being lowered due to the linearization control in an area in which the high output of the motor is required.

Figure 8:
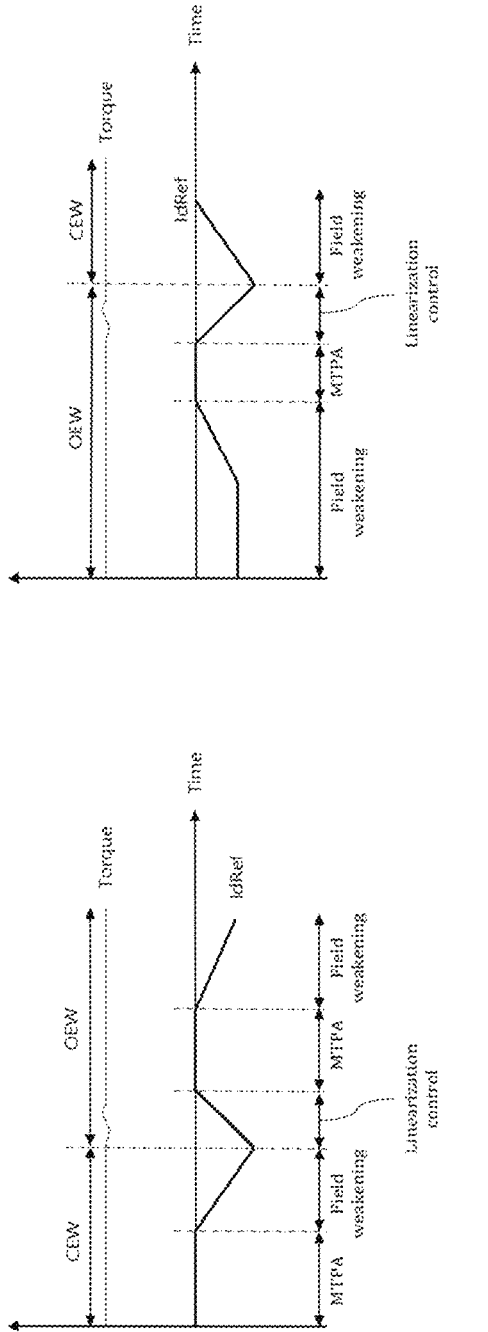
FIGS. 8 and 9 are diagrams illustrating the operation of the voltage utilization rate control unit alleviating the shock of the output torque of the motor occurring during the switching of the motor drive mode through the linearization control according to the embodiment of the present disclosure.
Figure 9:
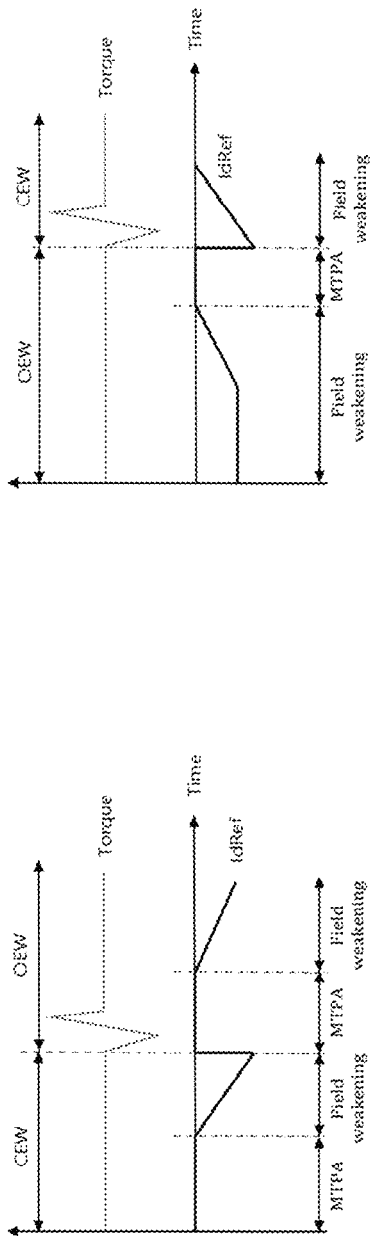

FIGS. 8 and 9 are diagrams illustrating the operation of the voltage utilization rate control unit alleviating the shock of the output torque of the motor occurring during the switching of the motor drive mode through the linearization control according to the embodiment of the present disclosure. FIG. 8 illustrates the embodiment of the present disclosure in which the linearization control is performed by the voltage utilization rate control unit 130 during the switching of the motor drive mode, and FIG. 9 illustrates comparative examples of a case in which the linearization control is not performed during the switching of the motor drive mode.

The left side of FIG. 8 corresponds to a case in which the speed of the motor increases as time passes, and the motor drive mode may be switched from the CEW mode to the OEW mode. In this case, as an MTPA control area is converted into the field weakening control area in a section in which the CEW mode is performed, D-axis current command IdRef may increase in a negative (−) direction. Next, when the motor drive mode is switched from the CEW mode to the OEW mode, the voltage utilization rate control unit 130 may adjust the voltage utilization rate control value (miRef of FIG. 5) such that the D-axis current command IdRef is linearized in a section in which linearization control is performed. Accordingly, the voltage utilization rate control unit 130 may alleviate the shock of the output torque of the motor when the field weakening control area of the CEW mode is converted into the MTPA control area of the OEW mode.

The right side of FIG. 8 corresponds to a case in which the speed of the motor decreases as time passes, and the motor drive mode may be switched from the OEW mode to the CEW mode. In this case, the voltage utilization rate control unit 130 may adjust the voltage utilization rate control value (miRef of FIG. 5) such that the D-axis current command IdRef is linearized in a section in which the linearization control is performed before the motor drive mode is switched from the OEW mode to the CEW mode. Accordingly, the voltage utilization rate control unit 130 may alleviate the shock of the output torque of the motor when the MTPA control area of the OEW mode is converted into the field weakening control area of the CEW mode.

The left side of FIG. 9 corresponds to a case in which the speed of the motor increases as time passes as in the left side of FIG. 8, and the right side of FIG. 9 corresponds to a case in which the speed of the motor decreases as time passes as in the right side of FIG. 8. As illustrated in FIG. 9, when the linearization control is not performed during the switching of the motor drive mode, the value of the D-axis current command IdRef changes rapidly, and thus the shock of the output torque of the motor may occur.

Figure 10:
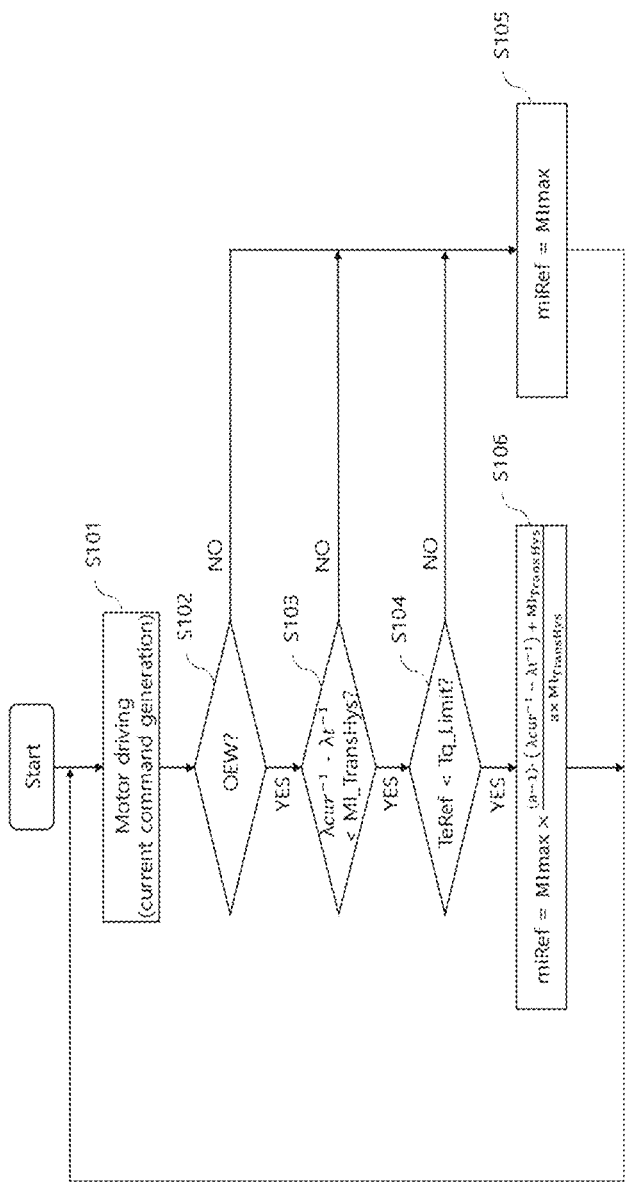
FIG. 10 is a flowchart illustrating a control method of the motor driving apparatus according to the embodiment of the present disclosure.

FIG. 10 is a flowchart illustrating a control method of the motor driving apparatus according to the embodiment of the present disclosure.

Referring to FIG. 10, the controller 100 may drive the motor 30 by switching the switching elements included in the inverters 10 and 20 at S101. In this case, the current command generation unit 110 may generate a current command for the motor 30 according to the torque command TeRef and the voltage utilization rate control value miRef.

Next, the voltage utilization rate control unit 130 may sequentially determine whether the motor drive mode is preset as the OEW mode at S102), whether the present counter magnetic flux of the motor $\lambda\text{cur}^{-1}$ is within a preset value MI_TransHys from the switching reference counter magnetic flux $\lambda t^{-1}$ at S103, and whether the torque command TeRef is lower than the preset torque limit value Tq_Limit at S104 so as to determine whether to perform linearization control for the D-axis current command.

In this case, when at least one of the determination conditions of S102, S103, and S104 is not satisfied, the voltage utilization rate control unit 130 may not perform the linearization control at S105. In this case, the voltage utilization rate control unit 130 may preset the maximum voltage utilization rate MImax according to the current speed of the motor as the voltage utilization rate control value miRef as in Equation 1 described above.

$$\text{miRef} = \text{MImax} \qquad \text{Equation 1:}$$

Unlike this, the voltage utilization rate control unit 130 may perform the linearization control at S106 when all of the determination conditions of S102, S103 and S104 are satisfied. In this case, the voltage utilization rate control unit 130 may adjust the voltage utilization rate control value miRef as in Equation 2 described above such that the value of the D-axis current command is linearized in a section in which the linearization control is performed.

$$miRef = MImax \times \frac{(a-1) \cdot (\lambda cur^{-1} - \lambda t^{-1}) + MI_{TransHys}}{a \times MI_{TransHys}} \qquad \text{Equation 2}$$

Meanwhile, the above-described present disclosure may be implemented as a computer readable code on a medium on which a program is recorded. A computer-readable medium includes all types of recording devices in which data that can be read by a computer system are stored. Examples of computer-readable media include a hard disk drive (HDD), a solid state disk (SSD), a silicon disk drive (SDD), ROM, RAM, a CD-ROM, a magnetic tape, a floppy disk, and an optical data storage device, etc. Accordingly, the above detailed description should not be considered as restrictive in all respects, but rather as exemplary. The scope of the present disclosure should be determined by a reasonable interpretation of the appended claims, and all modifications within a scope equivalent to the scope of the present disclosure are included in the scope of the present disclosure.

What is claimed is:

1. A motor driving apparatus comprising:
   a motor having a plurality of windings;
   a first inverter which is connected to a first end of each of the plurality of windings and drives the motor;
   a second inverter which is connected to a second end of each of the plurality of windings and selectively drives the motor according to a motor drive mode; and
   a controller which generates a current command for the motor according to a torque command and a voltage utilization rate control value, determines whether to perform linearization control for the current command based on a present counter magnetic flux of the motor and a switching reference counter magnetic flux for the motor drive mode, and adjusts the voltage utilization rate control value such that a value of the current command is linearized in a section in which the linearization control is performed.

2. The apparatus of claim 1, wherein the motor drive mode comprises:
   a closed end winding mode in which the second end of each of the plurality of windings and a neutral terminal for the plurality of windings are electrically connected to each other by a mode changeover switch and the motor is driven by the first inverter of the first inverter and the second inverter; and
   an open end winding mode in which the second end of each of the plurality of windings and the neutral terminal are electrically separated from each other by the mode changeover switch and the motor is driven by the first inverter and the second inverter.

3. The apparatus of claim 1, wherein the controller determines whether to perform the linearization control based on a determination whether the motor drive mode is preset as an open end winding mode and whether the present counter magnetic flux of the motor is within a preset value from the switching reference counter magnetic flux.

4. The apparatus of claim 3, wherein the controller determines whether to perform the linearization control based on a determination whether a value of the torque command is lower than a preset torque limit value.

5. The apparatus of claim 1, wherein when the motor drive mode is switched from a closed end winding mode to an open end winding mode, the controller linearly increases the voltage utilization rate control value until a stopping time of the linearization control after nonlinearly decreasing the voltage utilization rate control value at a starting time of the linearization control.

6. The apparatus of claim 5, wherein when the motor drive mode is switched from the open end winding mode to the closed end winding mode, the controller linearly decreases the voltage utilization rate control value from the starting time of the linearization control, and nonlinearly increases the voltage utilization rate control value at the stopping time of the linearization control.

7. The apparatus of claim 1, wherein the controller determines a maximum voltage utilization rate corresponding to a current speed of the motor by referring to a table,
presets the maximum voltage utilization rate as the voltage utilization rate control value when the linearization control is not performed, and
adjusts the voltage utilization rate control value based on the maximum voltage utilization rate and an available voltage multiple in the section in which the linearization control is performed.

8. The apparatus of claim 7, wherein when the present counter magnetic flux of the motor and the switching reference counter magnetic flux are the same in the section in which the linearization control is performed, the controller presets a value obtained by dividing the maximum voltage utilization rate by the available voltage multiple as the voltage utilization rate control value.

9. The apparatus of claim 7, wherein the motor drive mode comprises a closed end winding mode and an open end winding mode,
wherein the available voltage multiple corresponds to a ratio of an available voltage of the open end winding mode to an available voltage of the closed end winding mode.

10. A control method of a motor driving apparatus comprising a first inverter which drives a motor and a second inverter which selectively drives the motor according to a motor drive mode, the method comprising:
generating a current command for the motor according to a torque command and a voltage utilization rate control value;
determining whether to perform linearization control based on a present counter magnetic flux of the motor and a switching reference counter magnetic flux for the motor drive mode; and
adjusting the voltage utilization rate control value such that a value of the current command is linearized in a section in which the linearization control is performed.

11. The method of claim 10, wherein the first inverter is connected to a first end of each of a plurality of windings comprised in the motor, and
the second inverter is connected to a second end of each of the plurality of windings,
wherein the motor drive mode comprises:
a closed end winding mode in which the second end of each of the plurality of windings and a neutral terminal for the plurality of windings are electrically connected to each other by a mode changeover switch and the motor is driven by the first inverter of the first inverter and the second inverter; and
an open end winding mode in which the second end of each of the plurality of windings and the neutral terminal are electrically separated from each other by the mode changeover switch and the motor is driven by the first inverter and the second inverter.

12. The method of claim 10, wherein the determining of whether to perform the linearization control comprises:
determining whether the motor drive mode is preset as an open end winding mode; and
determining whether the present counter magnetic flux of the motor is within a preset value from the switching reference counter magnetic flux.

13. The method of claim 12, wherein the determining of whether to perform the linearization control further comprises determining whether a value of the torque command is lower than a preset torque limit value.

14. The method of claim 10, wherein the adjusting of the voltage utilization rate control value comprises: adjusting the voltage utilization rate control value based on a maximum voltage utilization rate according to a current speed of the motor and an available voltage multiple in the section in which the linearization control is performed,
wherein the motor drive mode comprises a closed end winding mode and an open end winding mode, and
the available voltage multiple corresponds to a ratio of an available voltage of the open end winding mode to an available voltage of the closed end winding mode.

15. The method of claim 10, further comprising:
presetting a maximum voltage utilization rate according to a current speed of the motor as the voltage utilization rate control value when the linearization control is not performed.

16. A non-transitory computer-readable recording medium storing a program that causes a processor to perform the control method of a motor driving apparatus according to claim 10.

* * * * *